US012187056B2

(12) United States Patent
Hiramatsu et al.

(10) Patent No.: US 12,187,056 B2
(45) Date of Patent: Jan. 7, 2025

(54) LIQUID EJECTING APPARATUS

(71) Applicant: SEIKO EPSON CORPORATION, Tokyo (JP)

(72) Inventors: Kazunori Hiramatsu, Nagano (JP); Yuichi Shikagawa, Nagano (JP); Mamoru Ukita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 133 days.

(21) Appl. No.: 18/186,982

(22) Filed: Mar. 21, 2023

(65) Prior Publication Data

US 2023/0302836 A1 Sep. 28, 2023

(30) Foreign Application Priority Data

Mar. 23, 2022 (JP) ................................ 2022-046481

(51) Int. Cl.
*B41J 29/393* (2006.01)

(52) U.S. Cl.
CPC ...... *B41J 29/393* (2013.01); *B41J 2029/3935* (2013.01); *B41J 2203/01* (2020.08)

(58) Field of Classification Search
CPC .............. B41J 29/393; B41J 2029/3935; B41J 2203/01
See application file for complete search history.

(56) References Cited

U.S. PATENT DOCUMENTS 8,678,540 B2 * 3/2014 Satoh ..................... B41J 29/393 347/19
9,288,367 B2 * 3/2016 Hirata .................. H04N 1/6044
2016/0080611 A1 * 3/2016 Yorimoto ............. H04N 1/6075 358/509
2018/0332189 A1 11/2018 Tatsuda

FOREIGN PATENT DOCUMENTS

JP 2018-187873 A 11/2018

* cited by examiner

*Primary Examiner* — Julian D Huffman
(74) *Attorney, Agent, or Firm* — Global IP Counselors, LLP

(57) ABSTRACT

A liquid ejecting apparatus includes an ejecting head and a camera unit for acquiring a state of the ejecting head, in which the camera unit includes a camera for imaging an object, a housing in which the camera is housed and which includes an opening on an imaging path that couples the camera and the object, and an opening/closing member, the opening/closing member includes a reference chart serving as a reference for adjustment of the camera and a chart cover, in a first mode, the opening/closing member brings the opening into a closed state, and the chart cover covers the reference chart, in a second mode, the opening/closing member brings the opening into an open state, and the chart cover covers the reference chart, and in a third mode, the opening/closing member brings the opening into the closed state, and the chart cover does not cover the reference chart.

6 Claims, 11 Drawing Sheets

LIQUID EJECTING APPARATUS

The present application is based on, and claims priority from JP Application Serial Number 2022-046481, filed Mar. 23, 2022, the disclosure of which is hereby incorporated by reference herein in its entirety.

BACKGROUND

1. Technical Field

The present disclosure relates to a liquid ejecting apparatus.

2. Related Art

A liquid ejecting apparatus, such as an ink jet printer, which forms an image on a medium by ejecting ink from nozzles has been known. Quality of an image formed by such a liquid ejecting apparatus may vary depending on the apparatus state. The liquid ejecting apparatus is thus required to detect a variation in its state and perform appropriate processing in accordance with the detection result.

For example, JP-A-2018-187873 discloses a printing apparatus (a liquid ejecting apparatus) that includes a camera for detecting a test pattern and that can perform high-quality printing by adjusting its state in accordance with the detection result obtained by the camera.

In the disclosure described in JP-A-2018-187873, however, the influence of ink mist floating inside the liquid ejecting apparatus is not taken into consideration, and improvement is thus required.

SUMMARY

A liquid ejecting apparatus according to an aspect of the disclosure is a liquid ejecting apparatus that forms an image by ejecting a liquid, and the liquid ejecting apparatus includes: an ejecting head for ejecting the liquid; and a camera unit for acquiring a state of the ejecting head, in which the camera unit includes a camera for imaging an object, a housing in which the camera is housed and which includes an opening on an imaging path that couples the camera and the object, and an opening/closing member configured to open and close the opening, the opening/closing member includes a reference chart serving as a reference for adjustment of the camera and a chart cover, in a first mode, the opening/closing member brings the opening into a closed state, and the chart cover covers the reference chart, in a second mode, the opening/closing member brings the opening into an open state, and the chart cover covers the reference chart, and in a third mode, the opening/closing member brings the opening into the closed state, and the chart cover does not cover the reference chart.

DESCRIPTION OF EXEMPLARY EMBODIMENTS

Hereinafter, suitable embodiments of the disclosure will be described with reference to the drawings. The drawings are provided for convenience of description. Note that the embodiments described below do not unreasonably limit the content of the disclosure described in the scope of the claims. In addition, the essential constituent elements of the disclosure are not limited to the configurations described below.

1. Outline of Liquid Ejecting Apparatus

Figure 1:
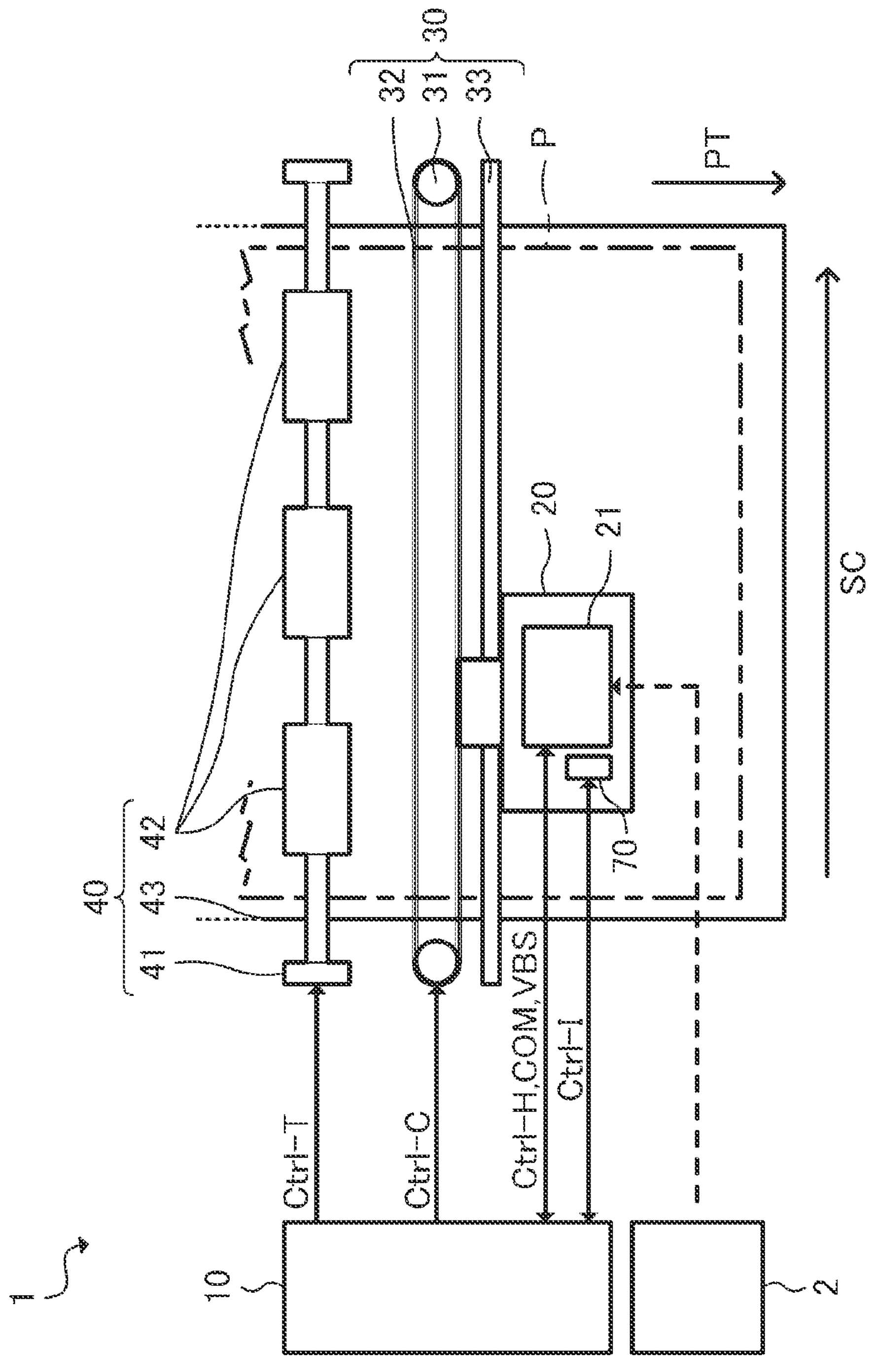
FIG. 1 illustrates a schematic structure of a liquid ejecting apparatus.

FIG. 1 illustrates a schematic structure of a liquid ejecting apparatus 1. The liquid ejecting apparatus 1 in the present embodiment transports a medium P in a transport direction PT and causes a carriage 20 to be reciprocated in a main scanning direction SC intersecting the transport direction PT. In conjunction with transporting of the medium P and reciprocation of the carriage 20, an ejecting head 21 mounted on the carriage 20 ejects ink, which is an example of a liquid. The ink thereby lands on the medium P at a desired position, and a desired image is formed on the medium P. That is, the liquid ejecting apparatus 1 in the present embodiment is an ink jet printer of a so-called serial printing type. Such a liquid ejecting apparatus 1 is able to use any printing object such as printing sheet, resin film, or fabric as the medium P.

As illustrated in FIG. 1, the liquid ejecting apparatus 1 includes an ink container 2, a control mechanism 10, the carriage 20, a moving mechanism 30, and a transport mechanism 40.

The ink container 2 stores a plurality of colors of ink to be ejected onto the medium P. Examples of a color of ink stored in the ink container 2 include black, cyan, magenta, yellow, red, and gray. As the ink container 2, an ink cartridge, a bag-like ink package made of a flexible film, an ink tank that is able to be replenished with ink, or the like may be used. Although the ink container 2 illustrated in FIG. 1 is provided at a position different from that of the carriage 20, the ink container 2 may be mounted on the carriage 20.

The control mechanism 10 includes a processing circuit, such as a CPU (central processing unit) or an FPGA (field programmable gate array), and a storage circuit, such as semiconductor memory. The control mechanism 10 controls the elements of the liquid ejecting apparatus 1.

The ejecting head 21 and a camera unit 70 are mounted on the carriage 20. In other words, the liquid ejecting apparatus 1 includes the carriage 20 that moves with the ejecting head 21 mounted thereon, and the camera unit 70 is mounted on the carriage 20. The carriage 20 is fixed to an endless belt 32 in a state of being supported by a carriage guide shaft 33 of the moving mechanism 30.

A control signal Ctrl-H, a drive signal COM, and a reference voltage signal VBS that are output by the control mechanism 10 are input to the ejecting head 21. Ink stored in the ink container 2 is supplied to the ejecting head 21 via a tube (not illustrated) or the like. In accordance with the control signal Ctrl-H and the drive signal COM that are input, the ejecting head 21 ejects ink supplied from the ink container 2.

A control signal Ctrl-I output by the control mechanism 10 is input to the camera unit 70. The camera unit 70 acquires various kinds of information indicating the state of the ejecting head 21 in accordance with the input control signal Ctrl-I and outputs the control signal Ctrl-I including the acquired information to the control mechanism 10.

The moving mechanism 30 includes a carriage motor 31, the endless belt 32, and the carriage guide shaft 33. The carriage motor 31 is rotationally driven in accordance with a control signal Ctrl-C input from the control mechanism 10. The endless belt 32 extends in the main scanning direction SC and rotates in accordance with the rotational drive of the carriage motor 31. The carriage guide shaft 33 extends in the main scanning direction SC and supports the carriage 20. As a result, the carriage 20 fixed to the endless belt 32 moves in the main scanning direction SC in a state of being supported by the carriage guide shaft 33. Accordingly, when the control mechanism 10 controls a rotation direction of the carriage motor 31 in accordance with the control signal Ctrl-C, the carriage 20 fixed to the endless belt 32 is reciprocated in the main scanning direction SC in a state of being supported by the carriage guide shaft 33.

The transport mechanism 40 includes a transport motor 41, a transport roller 42, and a platen 43. The transport motor 41 is rotationally driven in accordance with a control signal Ctrl-T input from the control mechanism 10. The transport roller 42 rotates in accordance with the rotational drive of the transport motor 41. The medium P is transported in the transport direction PT upon the rotation of the transport roller 42. At this time, the platen 43 supports the medium P that is transported. That is, the control mechanism 10 controls the rotational speed of the transport motor 41 in accordance with the control signal Ctrl-T to control transporting of the medium P supported by the platen 43 in the transport direction PT.

As described above, in the liquid ejecting apparatus 1 of the present embodiment, the control mechanism 10 controls transporting of the medium P and reciprocation of the carriage 20. Further, the control mechanism 10 outputs the control signal Ctrl-H and the drive signal COM to the ejecting head 21 in conjunction with transporting of the medium P by the transport mechanism 40 and reciprocation of the carriage 20 by the moving mechanism 30. That is, the ejecting head 21 ejects ink onto the medium P in conjunction with transporting of the medium P by the transport mechanism 40 and reciprocation of the carriage 20 by the moving mechanism 30. As a result, the ink ejected from the ejecting head 21 lands on the medium P at a desired position, and a desired image is formed on the medium P.

2. Functional Configuration of Liquid Ejecting Apparatus

Figure 2:
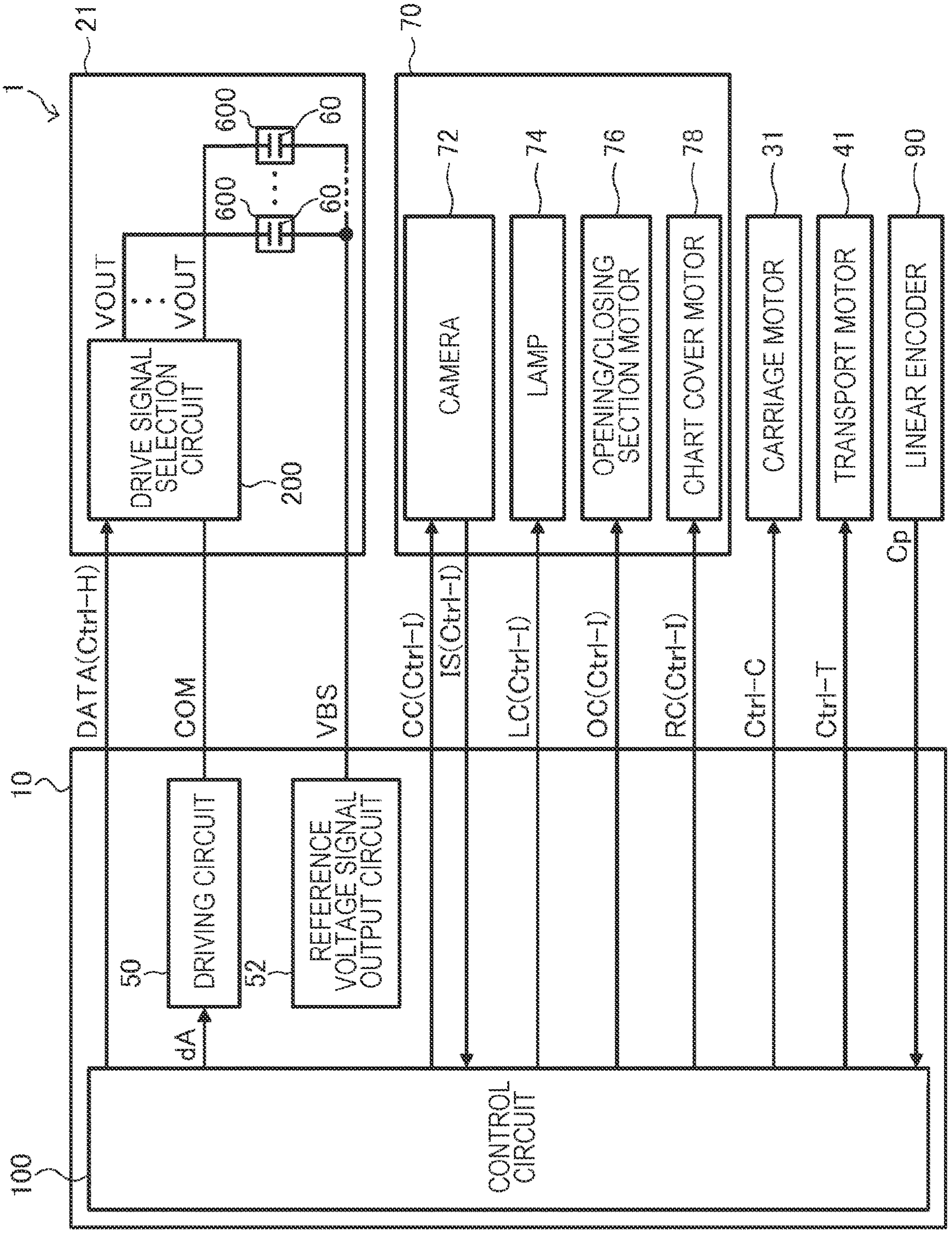
FIG. 2 illustrates a functional configuration of the liquid ejecting apparatus.

Next, a functional configuration of the liquid ejecting apparatus 1 will be described. FIG. 2 illustrates the functional configuration of the liquid ejecting apparatus 1. As illustrated in FIG. 2, the liquid ejecting apparatus 1 includes the control mechanism 10, the ejecting head 21, the carriage motor 31, the transport motor 41, the camera unit 70, and a linear encoder 90.

The control mechanism 10 includes a driving circuit 50, a reference voltage signal output circuit 52, and a control circuit 100.

The control circuit 100 includes, for example, a processor, such as a microcontroller, and is coupled to an external device (not illustrated), such as a host computer, provided outside the liquid ejecting apparatus 1 so as to enable communication. Various signals, such as image data, including information of an image formed on the medium P are input from the external device to the control circuit 100. In accordance with the input various signals, such as image data, the control circuit 100 generates various kinds of data for controlling the liquid ejecting apparatus 1 and various signals according to the data and outputs the resulting data and signals to the corresponding configurations.

A specific example of the operation of the control circuit 100 will be described. A position information signal Cp detected by the linear encoder 90 and indicating a scanning position of the carriage 20 is input to the control circuit 100. The control circuit 100 identifies the scanning position of the ejecting head 21 mounted on the carriage 20 in accordance with the input position information signal Cp. The control circuit 100 generates various signals including the control signals Ctrl-C, Ctrl-T, and Ctrl-H corresponding to the image data input from the external device and the position information signal Cp input from the linear encoder 90 and outputs the signals to the corresponding configurations.

Specifically, the control circuit 100 generates the control signal Ctrl-C for controlling reciprocation of the ejecting head 21 in accordance with the position information signal Cp and outputs the control signal Ctrl-C to the carriage motor 31. As a result, the scanning position of the ejecting head 21 in the main scanning direction SC is controlled. The control circuit 100 generates the control signal Ctrl-T for controlling transporting of the medium P and outputs the control signal Ctrl-T to the transport motor 41. As a result, the transport position of the medium P is controlled. In this case, the control signal Ctrl-C output by the control circuit 100 may be subjected to signal conversion in a driver circuit (not illustrated) and then input to the carriage motor 31, and similarly, the control signal Ctrl-T output by the control circuit 100 may be subjected to signal conversion in a driver circuit (not illustrated) and input to the transport motor 41.

The control circuit 100 generates ejection data DATA as the control signal Ctrl-H for controlling the ejecting head 21 in accordance with the input image data and the position information signal Cp and outputs the ejection data DATA to the ejecting head 21. An ejection timing and an ejection amount of the ink ejected from the ejecting head 21 are defined by the ejection data DATA.

The control circuit 100 outputs a base drive signal dA serving as a digital signal to the driving circuit 50. The driving circuit 50 performs digital-to-analog signal conversion on the input base drive signal dA serving as the digital signal and then performs class D amplification on the converted analog signal to thereby generate the drive signal COM. The driving circuit 50 then outputs the generated drive signal COM to the ejecting head 21. That is, the base drive signal dA is a digital signal for defining a signal waveform of the drive signal COM, and the driving circuit 50 performs class D amplification on the signal waveform defined by the base drive signal dA to thereby generate the drive signal COM.

Here, the base drive signal dA may be any signal capable of defining the signal waveform of the drive signal COM and may be an analog signal. There is no limitation as long as the driving circuit 50 is able to generate and output the drive signal COM by amplifying the signal waveform defined by the base drive signal dA. Accordingly, the driving circuit 50 may generate the drive signal COM by performing class A amplification, class B amplification, or class AB amplification on the signal waveform defined by the base drive signal dA.

The reference voltage signal output circuit 52 generates the reference voltage signal VBS serving as a reference potential for driving of a piezoelectric element 60, which will be described below, provided in the ejecting head 21. The reference voltage signal VBS may be a signal having a certain potential, such as a signal at a ground potential having a voltage value of 0 V or a DC voltage signal having a voltage value of 5.5 V, 6 V, or the like. The reference voltage signal output circuit 52 outputs the generated reference voltage signal VBS to the ejecting head 21.

As described above, the ejection data DATA output by the control circuit 100, the drive signal COM output by the driving circuit 50, and the reference voltage signal VBS output by the reference voltage signal output circuit 52 are input to the ejecting head 21. The ejecting head 21 includes a drive signal selection circuit 200 and a plurality of ejecting sections 600.

The drive signal selection circuit 200 is constituted by inclusion of one or more integrated circuit devices. The ejection data DATA and the drive signal COM are input to the drive signal selection circuit 200. The drive signal selection circuit 200 selects or deselects a signal waveform included in the drive signal COM in accordance with the input ejection data DATA to thereby generate a drive signal VOUT corresponding to each of the plurality of ejecting sections 600 and supplies the drive signal VOUT to one end of the piezoelectric element 60 included in the corresponding ejecting section 600. The reference voltage signal VBS is supplied in common to the other ends of the respective piezoelectric elements 60 included in the plurality of ejecting sections 600. When the piezoelectric element 60 is driven by a potential difference between the drive signal VOUT and the reference voltage signal VBS, ink is ejected from the ejecting section 600.

Figure 3:
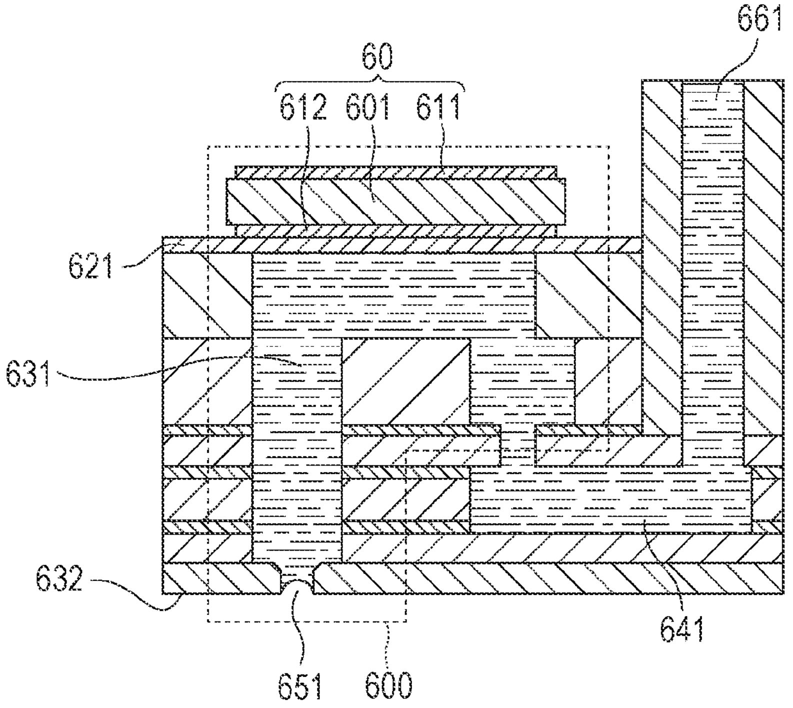
FIG. 3 is a view for explaining a schematic configuration of an ejecting section.

Here, the configuration of the ejecting section 600 for ejecting ink upon driving of the piezoelectric element 60 will be described. FIG. 3 is a view for explaining a schematic configuration of the ejecting section 600. FIG. 3 illustrates a nozzle plate 632, a reservoir 641, and a supply port 661 in addition to the ejecting section 600.

As illustrated in FIG. 3, the ejecting section 600 includes the piezoelectric element 60, a vibrating plate 621, a cavity 631, and a nozzle 651. The piezoelectric element 60 includes a piezoelectric body 601 and electrodes 611 and 612. The piezoelectric element 60 is formed such that the electrodes 611 and 612 hold the piezoelectric body 601 therebetween. Such a piezoelectric element 60 is driven such that a center portion is displaced in the up-down direction in accordance with a potential difference between the voltage supplied to the electrode 611 and the voltage supplied to the electrode 612. Specifically, the drive signal VOUT according to the drive signal COM is supplied to the electrode 611, and the reference voltage signal VBS is supplied to the electrode 612. When a voltage value of the drive signal VOUT supplied to the electrode 611 changes, a potential difference between the drive signal VOUT supplied to the electrode 611 and the reference voltage signal VBS supplied to the electrode 612 changes. As a result, the piezoelectric element 60 is driven such that the center portion is displaced in the up-down direction.

In FIG. 3, the vibrating plate 621 is positioned below the piezoelectric element 60. In other words, in FIG. 3, the piezoelectric element 60 is formed on an upper surface of the vibrating plate 621. Such a vibrating plate 621 is displaced in the up-down direction upon driving of the piezoelectric element 60 in the up-down direction.

In FIG. 3, the cavity 631 is positioned below the vibrating plate 621. Ink is supplied from the reservoir 641 to the cavity 631. The ink stored in the ink container 2 is introduced to the reservoir 641 via the supply port 661. That is, the ink stored in the ink container 2 is filled into the cavity 631. With the displacement of the vibrating plate 621 in the up-down direction, the internal volume of such a cavity 631 is increased or decreased. That is, the vibrating plate 621 functions as a diaphragm that changes the internal volume of the cavity 631, and the cavity 631 functions as a pressure chamber a pressure of which changes with the displacement of the vibrating plate 621 in the up-down direction.

The nozzle 651 is an opening provided in the nozzle plate 632 and communicates with the cavity 631. When the internal volume of the cavity 631 changes, the ink filled into the cavity 631 is ejected from the nozzle 651 in accordance with the change in the internal volume. That is, in the liquid ejecting apparatus 1, the ejecting section 600 is positioned such that the nozzle plate 632 faces the medium P and the platen 43 that supports the medium P.

In the ejecting section 600 configured as described above, when the piezoelectric element 60 is driven so as to bend upward, the vibrating plate 621 is displaced upward. This increases the internal volume of the cavity 631, resulting in the ink stored in the reservoir 641 being drawn into the cavity 631. On the other hand, when the piezoelectric element 60 is driven so as to bend downward, the vibrating plate 621 is displaced downward. This decreases the internal volume of the cavity 631, resulting in ink in the amount corresponding to the degree of the decrease in the internal volume of the cavity 631 being ejected from the nozzle 651.

Note that the piezoelectric element 60 is not limited to having the structure illustrated in FIG. 3 and may have any structure as long as the piezoelectric element 60 is driven upon supplying of the drive signal VOUT according to the drive signal COM and ink is able to be ejected from the nozzle 651 by the piezoelectric element 60 being driven.

With reference back to FIG. 2, the control circuit 100 generates the control signal Ctrl-I in response to a user operation or at a predetermined timing and outputs the control signal Ctrl-I to the camera unit 70.

Specifically, the camera unit 70 includes a camera 72, a lamp 74, an opening/closing section motor 76, and a chart cover motor 78. A camera control signal CC as the control signal Ctrl-I output by the control circuit 100 is input to the camera 72. The camera 72 acquires an image in accordance with the input camera control signal CC and generates an image information signal IS including information of the acquired image. The camera 72 then outputs the generated image information signal IS to the control circuit 100 as the control signal Ctrl-I.

A lamp control signal LC as the control signal Ctrl-I output by the control circuit 100 is input to the lamp 74. The lamp 74 is switched on and off in accordance with the input lamp control signal LC. Such a lamp 74 functions as a light source for the camera 72 to acquire an image and may be, for example, an LED (light emitting diode).

An opening/closing motor control signal OC as the control signal Ctrl-I output by the control circuit 100 is input to the opening/closing section motor 76. The opening/closing section motor 76 is driven in accordance with the input opening/closing motor control signal OC. When the opening/closing section motor 76 is driven, movement of an opening/closing member 760 described later is controlled.

A chart cover motor control signal RC as the control signal Ctrl-I output by the control circuit 100 is input to the chart cover motor 78. The chart cover motor 78 is driven in accordance with the input chart cover motor control signal RC. When the chart cover motor 78 is driven, movement of a chart cover 780 described later is controlled.

The camera unit 70 configured as described above acquires various kinds of information indicating the state of the ejecting head 21 and outputs the information to the control circuit 100.

For example, in the camera unit 70 of the present embodiment, the camera 72 acquires, from the medium P on which a predetermined pattern image is formed, image information of the pattern image as information indicating the state of the ejecting head 21. The camera 72 then generates the image information signal IS including the acquired image information and outputs the image information signal IS to the control circuit 100. The control circuit 100 compares the image information included in the input image information signal IS and information corresponding to the pattern image stored in the control circuit 100. In accordance with the result of the comparison, the control circuit 100 identifies an ejection state of the ink ejected from the ejecting head 21 and a landing position of the ink ejected from ejecting head 21. The control circuit 100 corrects the control signals Ctrl-T, Ctrl-C, and Ctrl-H in accordance with the identified ejection state of the ink ejected from the ejecting head 21 and the identified landing position of the ink ejected from the ejecting head 21. As a result, quality of the image formed on the medium P is improved.

As described above, the liquid ejecting apparatus 1 of the present embodiment includes the ejecting head 21 for ejecting ink, which is an example of a liquid, and the camera unit 70 for acquiring the state of the ejecting head 21 and corrects at least one of an ejection timing and an ejection amount of the ink ejected from the ejecting head 21, a moving speed of the carriage 20 on which the ejecting head 21 is mounted, and a transport speed of the medium P in accordance with the state of the ejecting head 21, which is acquired by the camera unit 70. As a result, quality of the image formed on the medium P is improved.

3. Structure and Operation of Camera Unit

As described above, the liquid ejecting apparatus 1 of the present embodiment includes the ejecting head 21 for ejecting ink, which is an example of a liquid, and the camera unit 70 for acquiring the state of the ejecting head 21 and corrects at least one of an ejection timing and an ejection amount of the ink ejected from the ejecting head 21, a moving speed of the carriage 20 on which the ejecting head 21 is mounted, and a transport speed of the medium P in accordance with the state of the ejecting head 21, which is acquired by the camera unit 70. As a result, quality of the image formed on the medium P is improved.

Accordingly, accuracy in acquisition of an image by the camera unit 70 in the liquid ejecting apparatus 1 is important in terms of improvement of quality of an image formed on the medium P by the liquid ejecting apparatus 1, and the camera unit 70 performs calibration at a predetermined timing to reduce the possibility of accuracy in acquisition of an image being lowered. An example of the structure of the camera unit 70 having such a calibration function will be described.

Figure 4:
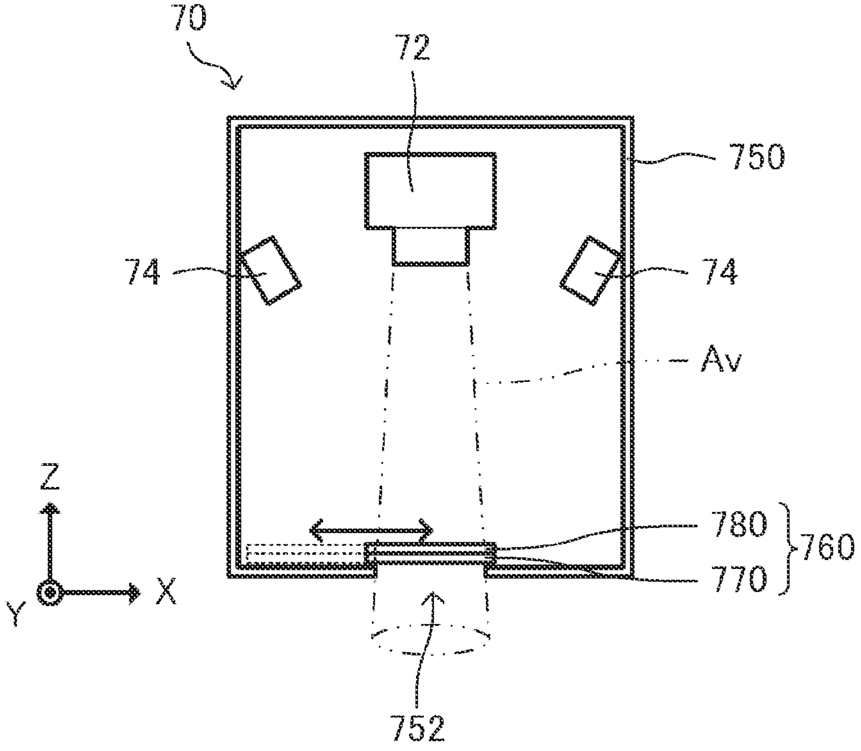
FIG. 4 illustrates an example of a structure of a camera unit.

FIG. 4 illustrates an example of the structure of the camera unit 70. FIG. 4 illustrates the X direction, the Y direction, and the Z direction as directions orthogonal to each other. Here, in the following description, the tail of an arrow indicating the X direction in the drawing may be referred to as the −X side, the tip thereof in the drawing may be referred to as the +X side, the tail of an arrow indicating the Y direction in the drawing may be referred to as the −Y side, the tip of thereof in the drawing may be referred to as the +Y side, the tail of an arrow indicating the Z direction in the drawing may be referred to as the −Z side, and the tip thereof in the drawing may be referred to as the +Z side.

As illustrated in FIG. 4, the camera unit 70 includes the camera 72, a plurality of lamps 74, the opening/closing member 760, and a housing 750.

The housing 750 houses the camera 72, the plurality of lamps 74, a chart plate 770, and the chart cover 780 and includes an opening 752 on the −Z side. In other words, the housing 750 has an interior space in which the camera 72, the plurality of lamps 74, the chart plate 770, and the chart cover 780 are housed and includes the opening 752 on the −Z side for enabling the interior space to communicate with the outside of the housing 750. The camera unit 70 acquires various kinds of information indicating the state of the ejecting head 21 via the opening 752 of the housing 750. That is, the camera unit 70 of the present embodiment is provided in the liquid ejecting apparatus 1 such that the opening 752 of the housing 750 faces an object for acquiring various kinds of information indicating the state of the ejecting head 21.

The camera 72 is positioned on the +Z side in the housing 750. The camera 72 acquires, via the opening 752, image information of a pattern image formed on the medium P as information indicating the state of the ejecting head 21 in accordance with the camera control signal CC output by the control circuit 100. Accordingly, when the camera unit 70 acquires image information of the predetermined pattern image as information indicating the state of the ejecting head 21, at least a portion of the camera 72, at least a portion of the opening 752, and at least a portion of the pattern image formed on the medium P overlap each other in the Z direction. That is, the housing 750 includes the opening 752 positioned on an imaging path that couples the camera 72 for imaging the pattern image, which is an example of an object, formed on the medium P and the pattern image, which is an example of the object, formed on the medium P. Note that an angle of view Av to be set when the camera 72 acquires the pattern image formed on medium P is indicated by a broken line in FIG. 4.

On and off of the plurality of lamps 74 is controlled by the lamp control signal LC output by the control circuit 100. The plurality of lamps 74 thus provide appropriate luminance for the camera 72 to image an object. As a result, accuracy in acquisition of a pattern image as information indicating the state of the ejecting head 21 by the camera 72 is improved. Such a plurality of lamps 74 are provided in the housing 750 so as to be positioned outside the angle of view Av to be set when the camera 72 acquires the pattern image formed on the medium P.

The opening/closing member 760 is moved in the X direction by a drive force of the opening/closing section motor 76 driven by the opening/closing motor control signal OC output by the control circuit 100. Specifically, when the liquid ejecting apparatus 1 performs a printing operation of forming an image on the medium P, the opening/closing member 760 is positioned so as to cover the opening 752 and thereby closes the interior space of the housing 750. Moreover, when the camera unit 70 acquires image information of the predetermined pattern image formed on the medium P as information indicating the state of the ejecting head 21, the opening/closing member 760 is positioned so as not to cover the opening 752 and thereby opens the interior space of the housing 750. Note that details of the operation of the opening/closing member 760 will be described below.

The opening/closing member 760 includes the chart plate 770 and the chart cover 780. The chart plate 770 and the chart cover 780 are positioned so as to overlap each other with the chart plate 770 on the −Z side and the chart cover 780 on the +Z side in the Z direction.

Figure 5:
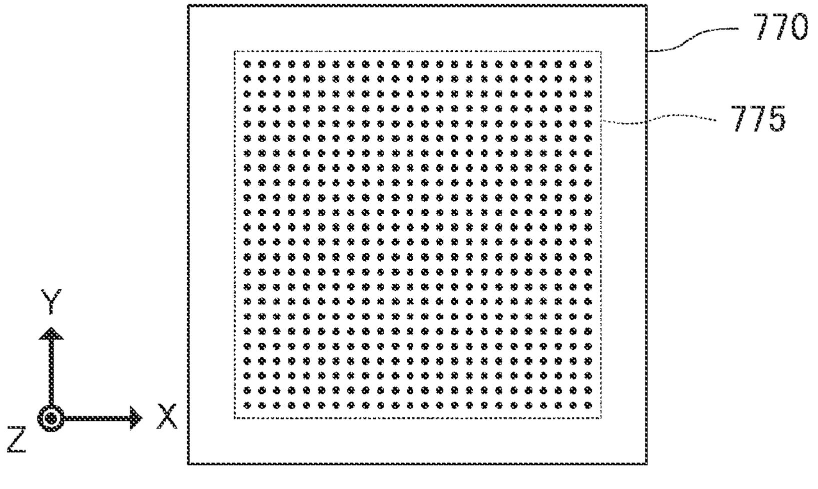
FIG. 5 illustrates an example of a configuration of a chart plate.

The chart plate 770 is configured to perform calibration of the camera 72 and is used to perform, for example, aberration correction of the camera 72. FIG. 5 illustrates an example of the configuration of the chart plate 770. As illustrated in FIG. 5, a reference chart 775 is provided on the +Z-side surface of the chart plate 770. The reference chart 775 includes a plurality of dots disposed in a grid shape at an equivalent interval. The camera 72 acquires an image of the reference chart 775 to perform calibration. The camera 72 then generates the image information signal IS including the acquired image information of the reference chart 775 and outputs the image information signal IS to the control circuit 100. The control circuit 100 compares the image information of the reference chart 775 included in the input image information signal IS and information corresponding to the reference chart 775 stored in the control circuit 100. In accordance with the result of the comparison, the control circuit 100 performs calibration for calculating a correction value of the image information acquired by the camera 72. In other words, the reference chart 775 includes an aberration correction chart.

With reference back to FIG. 4, the chart cover 780 is moved in the X direction by a drive force of the chart cover motor 78 driven by the chart cover motor control signal RC output by the control circuit 100.

Specifically, when the control circuit 100 does not perform calibration of the camera 72, the chart cover 780 is controlled to be positioned on the +Z side with respect to the chart plate 770 by the chart cover motor control signal RC. At this time, the chart cover 780 protects the reference chart 775 provided on the +Z-side surface of the chart plate 770. That is, when the control circuit 100 does not perform calibration of the camera 72, the chart cover 780 is positioned so as to cover the reference chart 775 provided on the +Z-side surface of the chart plate 770.

On the other hand, when the control circuit 100 performs calibration of the camera 72, the chart cover 780 is controlled to be moved to the −X side in the X direction on the +Z side with respect to the chart plate 770 by the chart cover motor control signal RC. Specifically, when the control circuit 100 performs calibration of the camera 72, the chart cover 780 is moved to a position at which the chart cover 780 does not overlap at least a portion of the reference chart 775 provided on the +Z-side surface of the chart plate 770 in the Z direction. As a result, it is possible to acquire the image information of the reference chart 775 in the camera 72, and calibration of the camera 72 is performed.

As described above, the camera unit 70 includes the camera 72 for imaging a predetermined pattern image, which is an example of an object, formed on the medium P by the ejecting head 21 ejecting liquid as information indicating the state of the ejecting head 21, the housing 750 that houses the camera 72 and includes the opening 752 on the imaging path for coupling the camera 72 and the object, and the opening/closing member 760 capable of opening and closing the opening 752, and the opening/closing member 760 includes the reference chart 775 serving as a reference for adjustment of the camera 72 and the chart cover 780. The operation of such a camera unit 70 is switched in accordance with an operation mode of the liquid ejecting apparatus 1, specifically, a print mode Mp in which the liquid ejecting apparatus 1 forms a desired image on the medium P, a check mode Mt in which the liquid ejecting apparatus 1 checks the state of the ejecting head 21, and an adjustment mode Mc in which the liquid ejecting apparatus 1 performs adjustment of the camera unit 70 used for checking.

Figure 6:
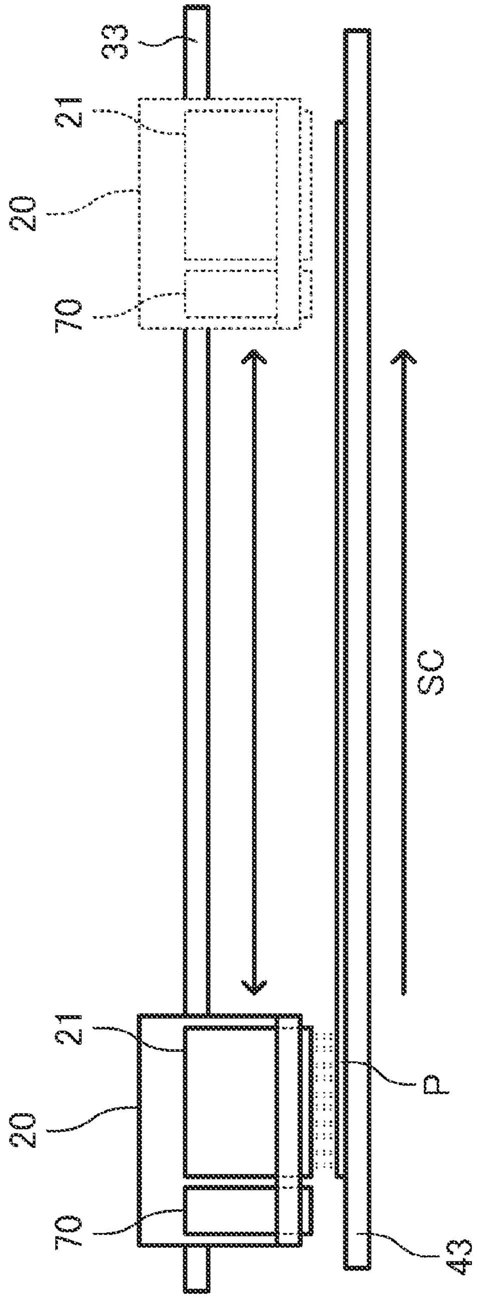
FIG. 6 illustrates an example of operation of a carriage on which the camera unit is mounted in a print mode.

First, the operation of the camera unit 70 when the operation mode of the liquid ejecting apparatus 1 is the print mode Mp will be described. FIG. 6 illustrates an example of the operation of the carriage 20 on which the camera unit 70 is mounted in the print mode Mp.

As illustrated in FIG. 6, in the print mode Mp, the carriage 20 is reciprocated in the main scanning direction SC. At this time, the ejecting head 21 mounted on the carriage 20 ejects ink onto the medium P in accordance with image data input from an external device or the like. An image corresponding to the input image data is thereby formed on the medium P. At this time, the camera unit 70 does not acquire information of the image formed on the medium P.

Figure 7:
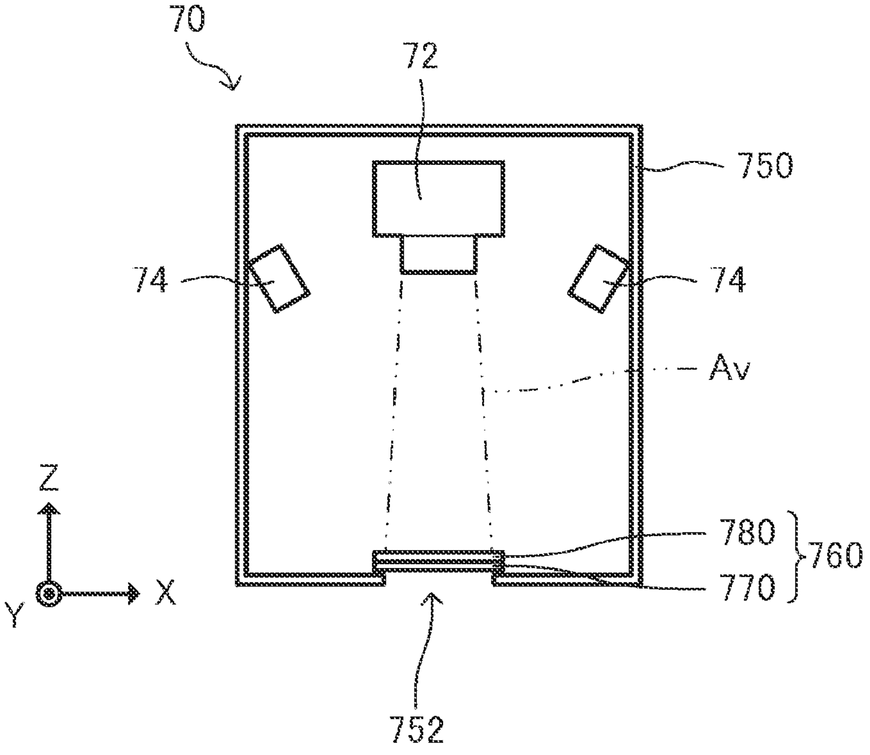
FIG. 7 illustrates the camera unit in the print mode when viewed in the Y direction.
Figure 8:
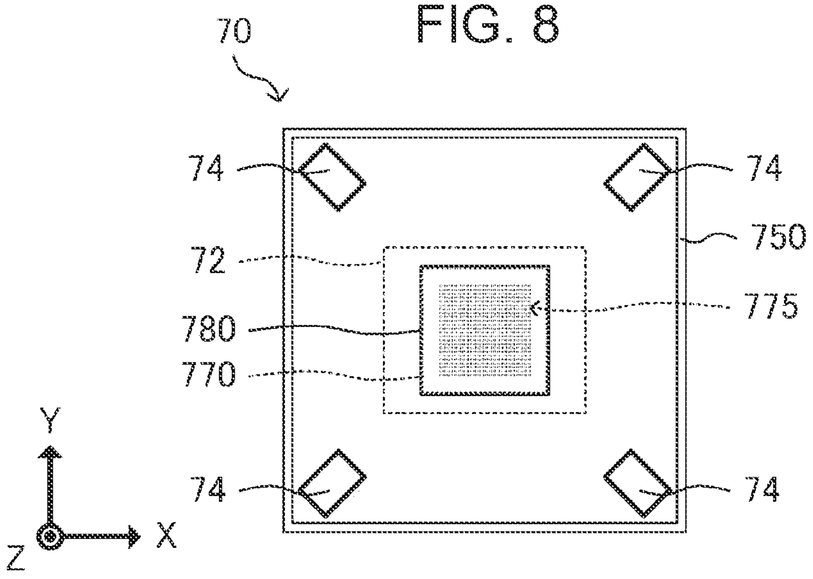
FIG. 8 illustrates the camera unit in the print mode when viewed in the Z direction.

Details of the camera unit 70 in the print mode Mp will be described. FIG. 7 illustrates the camera unit 70 in the print mode Mp when viewed in the Y direction, and FIG. 8 illustrates the camera unit 70 in the print mode Mp when viewed in the Z direction.

As illustrated in FIG. 7, in the print mode Mp, the opening/closing member 760 of the camera unit 70 is positioned so as to cover the opening 752 of the housing 750. Specifically, the control circuit 100 outputs the opening/closing motor control signal OC for causing the opening/closing member 760 to move to the position at which the opening/closing member 760 covers the opening 752. The opening/closing section motor 76 is thereby driven, and the opening/closing member 760 is moved in the X direction upon driving of the opening/closing section motor 76. When the opening/closing member 760 reaches the position at which the opening/closing member 760 covers the opening 752, the control circuit 100 stops the movement of the opening/closing member 760. As a result, the interior space of the housing 750 of the camera unit 70 is closed. That is, in the print mode Mp, the opening/closing member 760 brings the opening 752 into a closed state.

When the liquid ejecting apparatus 1 operates in the print mode Mp, the ejecting head 21 ejects ink onto the medium P. At this time, some ink ejected from the ejecting head 21 floats in the liquid ejecting apparatus 1 as ink mist. In such a print mode Mp, the opening/closing member 760 brings the opening 752 into the closed state, and this reduces the possibility of the ink mist that floats in the liquid ejecting apparatus 1 entering the interior space of the housing 750.

This results in a reduction in the possibility of the ink mist attaching to the camera 72 housed in the housing 750 and the possibility of a degradation in quality of image information acquired by the camera 72.

Moreover, as illustrated in FIG. 8, in the print mode Mp, the chart cover 780 is positioned so as to cover the reference chart 775 provided in the chart plate 770. As described above, the reference chart 775 is used for performing calibration of the camera 72. Accordingly, when the reference chart 775 is soiled, accuracy of calibration of the camera 72 is lowered, resulting in a possible degradation in quality of image information acquired by the camera 72. By covering such a reference chart 775 with the chart cover 780, even when ink mist enters the housing 750, ink mist is less likely to attach to the reference chart 775. This results in a reduction in the possibility of accuracy in calibration of the camera 72 being lowered and also the possibility of a degradation in quality of image information acquired by the camera 72.

Figure 9A:
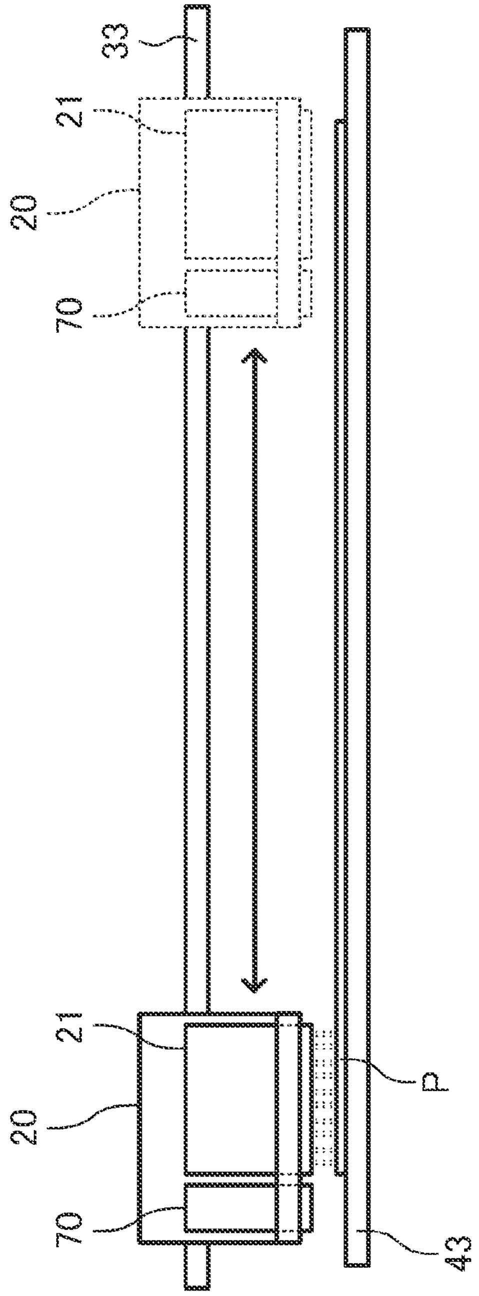
FIGS. 9A and 9B each illustrate an example of operation of the carriage on which the camera unit is mounted in a check mode.
Figure 9B:
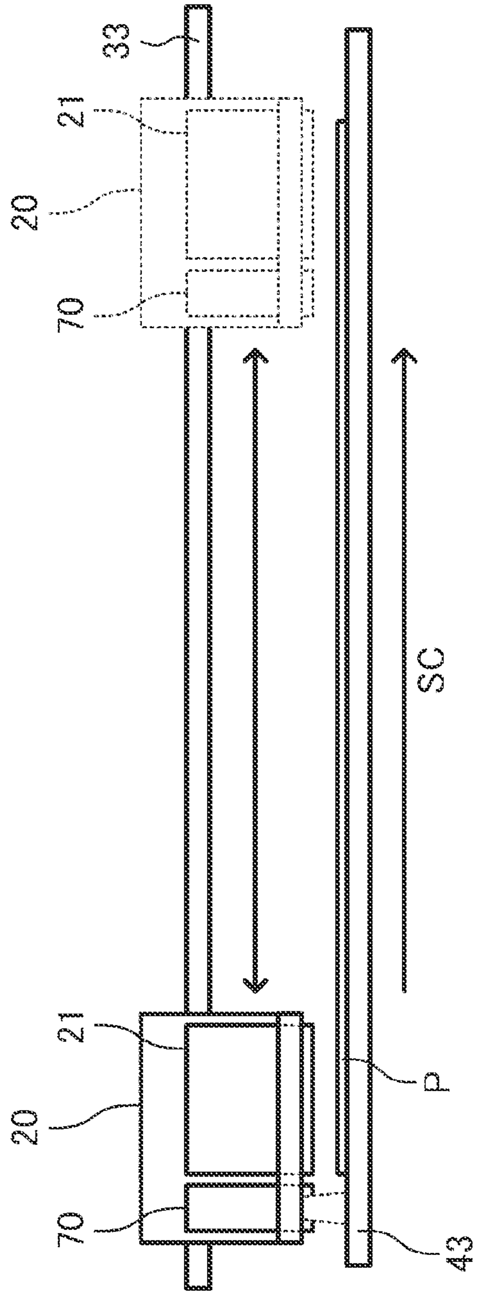

Next, the operation of the camera unit 70 when the operation mode of the liquid ejecting apparatus 1 is the check mode Mt will be described. FIGS. 9A and 9B each illustrate an example of the operation of the carriage 20 on which the camera unit 70 is mounted in the check mode Mt.

As illustrated in FIGS. 9A and 9B, in the liquid ejecting apparatus 1 in the check mode Mt, the ejecting head 21 ejects ink to thereby print a predetermined pattern image on the medium P without using image data, and the camera unit 70 then acquires information of the formed pattern image. In accordance with the information of the pattern image acquired by the camera unit 70, the control circuit 100 determines the state of the ejecting head 21 and performs a predetermined correction operation. This reduces the possibility of a degradation in printing quality of the liquid ejecting apparatus 1. FIG. 9A illustrates a step in which the ejecting head 21 ejects ink to thereby print a predetermined pattern image on the medium P and FIG. 9B illustrates a step in which the camera unit 70 acquires information of the formed pattern image.

As illustrated in FIG. 9A, in the step in which the ejecting head 21 ejects ink to thereby print a predetermined pattern image on the medium P, the carriage 20 is reciprocated in the main scanning direction SC. At this time, the ejecting head 21 mounted on the carriage 20 ejects ink onto the medium P. The predetermined pattern image is thereby formed on the medium P. At this time, the camera unit 70 does not acquire information of the image formed on the medium P.

Subsequently, as illustrated in FIG. 9B, in the step in which the camera unit 70 acquires the predetermined pattern image formed on the medium P, the carriage 20 is reciprocated again in the main scanning direction SC. The camera unit 70 mounted on the carriage 20 acquires the predetermined pattern image formed on the medium P. At this time, the ejecting head 21 does not eject ink.

The camera unit 70 generates the image information signal IS including the acquired image information and outputs the image information signal IS to the control circuit 100. The control circuit 100 determines the state of the ejecting head 21 in accordance with the input image information signal IS. The control circuit 100 generates the control signals Ctrl-C, Ctrl-T, and Ctrl-H corrected in accordance with the result of the determination and outputs the signals to the corresponding configurations.

Figure 10B:
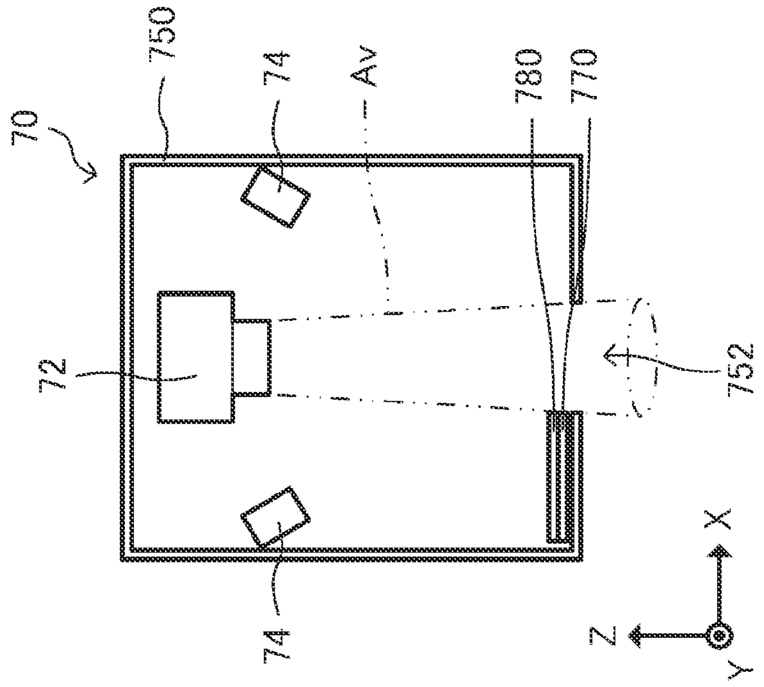
FIGS. 10A and 10B each illustrate the camera unit in the check mode when viewed in the Y direction.
Figure 10A:
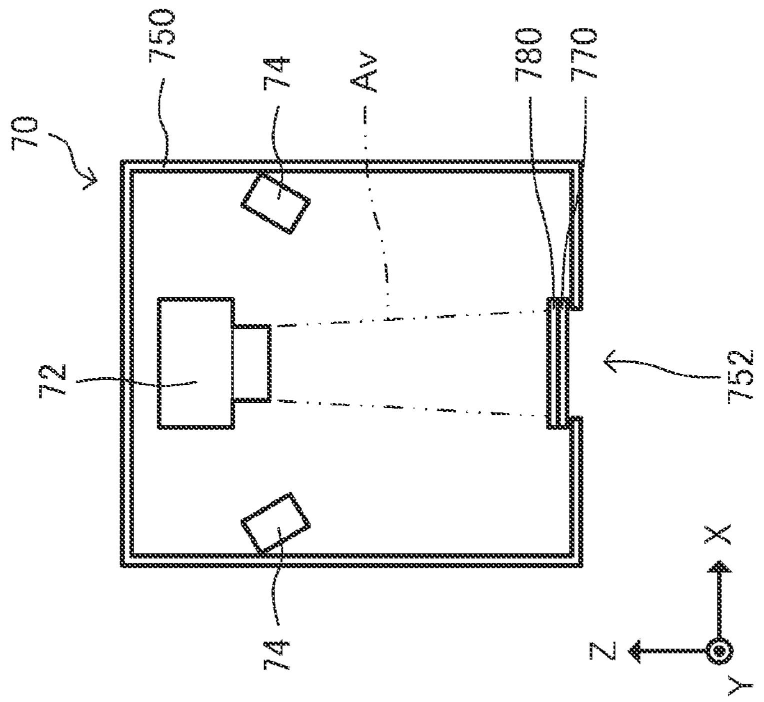

Details of the camera unit 70 in the check mode Mt as above will be described. FIGS. 10A and 10B each illustrate the camera unit 70 in the check mode Mt when viewed in the Y direction, and FIGS. 11A and 11B each illustrate the camera unit 70 in the check mode Mt when viewed in the Z direction. Here, as in FIGS. 9A and 9B, FIGS. 10A and 11A each illustrate a step in which the ejecting head 21 ejects ink to thereby print a predetermined pattern image on the medium P and FIGS. 10B and 11B each illustrate a step in which the camera unit 70 acquires information of the formed pattern image.

As illustrated in in FIG. 10A, in the step in which the ejecting head 21 ejects ink to thereby print a predetermined pattern image on the medium P in the check mode Mt, the opening/closing member 760 of the camera unit 70 is positioned so as to cover the opening 752 of the housing 750. Specifically, the control circuit 100 outputs the opening/closing motor control signal OC for causing the opening/closing member 760 to move to the position at which the opening/closing member 760 covers the opening 752. The opening/closing section motor 76 is thereby driven, and the opening/closing member 760 is moved in the X direction upon driving of the opening/closing section motor 76. When the opening/closing member 760 reaches the position at which the opening/closing member 760 covers the opening 752, the control circuit 100 stops the movement of the opening/closing member 760. As a result, the interior space of the housing 750 of the camera unit 70 is closed. That is, the opening/closing member 760 brings the opening 752 into the closed state.

As illustrated in in FIG. 10B, in the step in which the camera unit 70 acquires information of the pattern image formed on the medium P in the subsequent check mode Mt, the opening/closing member 760 of the camera unit 70 is positioned so as not to cover the opening 752 of the housing 750. Specifically, the control circuit 100 outputs the opening/closing motor control signal OC for causing the opening/closing member 760 to move to a position at which the opening/closing member 760 does not cover the opening 752. The opening/closing section motor 76 is thereby driven, and the opening/closing member 760 is moved in the X direction upon driving of the opening/closing section motor 76. When the opening/closing member 760 reaches a position at which the opening/closing member 760 does not cover at least a portion of the opening 752, the control circuit 100 stops the movement of the opening/closing member 760. As a result, the interior space of the housing 750 of the camera unit 70 is open. That is, in the check mode Mt, the opening/closing member 760 brings the opening 752 into an open state. As a result, the camera 72 housed in the interior space of the housing 750 acquires the predetermined pattern image formed on the medium P upon the movement of carriage 20 on which the camera unit 70 is mounted.

When the liquid ejecting apparatus 1 is in the check mode Mt, after the ejecting head 21 ejects ink onto the medium P to thereby form a predetermined pattern image on the medium P, ejection of the ink from the ejecting head 21 is stopped, and the camera unit 70 acquires the pattern image formed on the medium P. In such a check mode Mt, during a period in which the ejecting head 21 ejects ink onto the medium P to thereby form the predetermined pattern image on the medium P, the opening/closing member 760 of the camera unit 70 brings the opening 752 into the closed state, and this reduces the possibility of floating ink mist entering the interior space of the housing 750. During a period in which the camera unit 70 acquires the pattern image formed on the medium P, the opening/closing member 760 of the camera unit 70 brings the opening 752 into the open state, and this reduces the possibility of the opening/closing member 760 hindering the camera 72 from acquiring the pattern image formed on the medium P and improves accuracy in acquisition the pattern image in the camera 72.

Figure 11A:
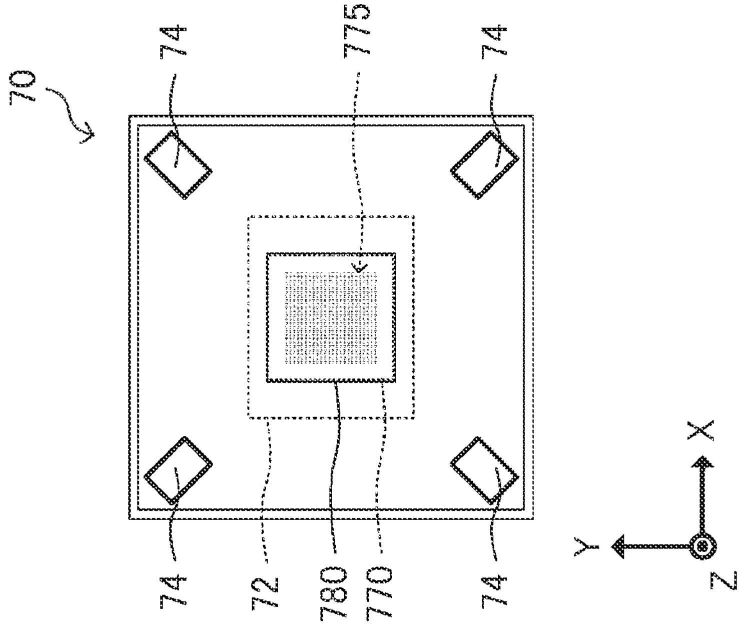
FIGS. 11A and 11B each illustrate the camera unit in the check mode when viewed in the Z direction.
Figure 11B:
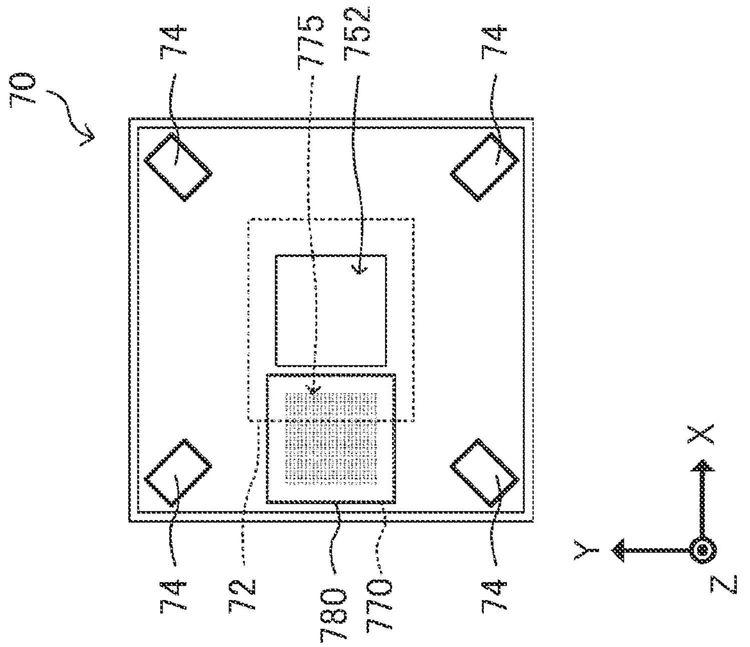

Moreover, in both of the step in which the ejecting head 21 ejects ink to thereby print a predetermined pattern image on the medium P in the check mode Mt as illustrated in in FIG. 11A, and the step in which the camera unit 70 acquires information of the pattern image formed on the medium P in the check mode Mt as illustrated in in FIG. 11B, the chart cover 780 is positioned so as to cover the reference chart 775 provided in the chart plate 770. In the check mode Mt, when the camera unit 70 acquires information of the pattern image formed on the medium P, the opening/closing member 760 of the camera unit 70 is brought into the open state. This increases the possibility of ink mist entering the housing 750 through the opening 752 and also increases the possibility of the reference chart 775 being soiled. Against such a problem, in the camera unit 70 of the present embodiment, in the check mode Mt, the chart cover 780 is positioned so as to cover the reference chart 775 provided in the chart plate 770, and the reference chart 775 is thereby protected by the chart cover 780, which reduces the possibility of ink mist attaching to the reference chart 775. This results in a reduction in the possibility of accuracy in performing calibration of the camera 72 being lowered and the possibility of a degradation in quality of image information acquired by the camera 72.

Figure 12:
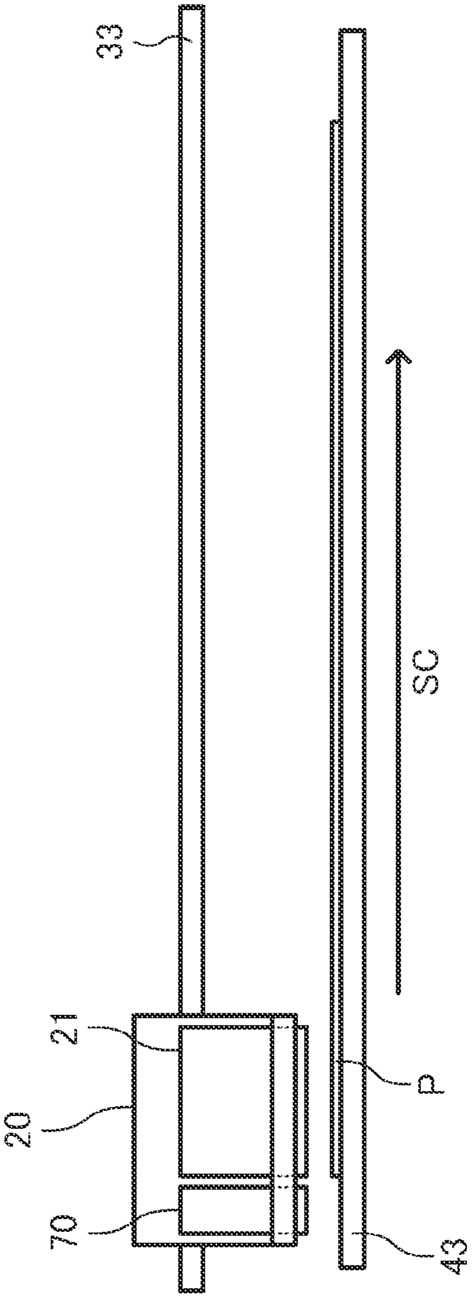
FIG. 12 illustrates an example of operation of the carriage on which the camera unit is mounted in an adjustment mode.

Next, the operation of the camera unit 70 when the operation mode of the liquid ejecting apparatus 1 is the adjustment mode Mc will be described. FIG. 12 illustrates an example of the operation of the carriage 20 on which the camera unit 70 is mounted in the adjustment mode Mc.

As illustrated in FIG. 12, in the adjustment mode Mc, the carriage 20 is stopped in one end in a movement range in which the carriage 20 moves in the main scanning direction SC. In the adjustment mode Mc, calibration of the camera 72 of the camera unit 70 is performed. At this time, the ejecting head 21 does not eject ink, and the camera unit 70 does not acquire information of the image formed on the medium P.

Figure 13:
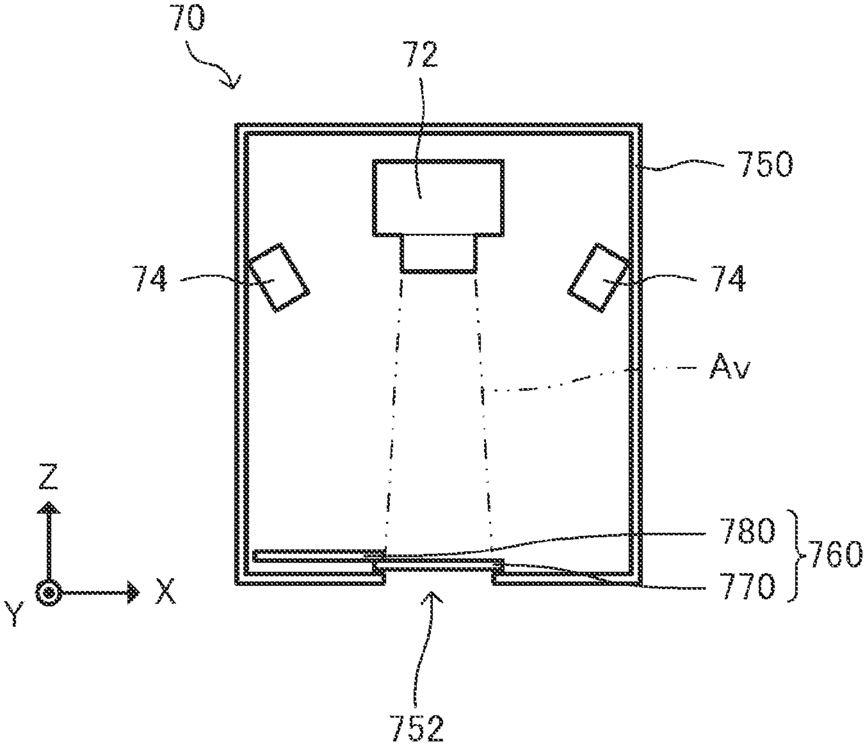
FIG. 13 illustrates the camera unit in the adjustment mode when viewed in the Y direction.

Details of the camera unit 70 in the adjustment mode Mc will be described. FIG. 13 illustrates the camera unit 70 in the adjustment mode Mc when viewed in the Y direction, and FIG. 14 illustrates the camera unit 70 in the adjustment mode Mc when viewed in the Z direction.

As illustrated in FIG. 13, in the adjustment mode Mc, the opening/closing member 760 of the camera unit 70 is positioned so as to cover the opening 752 of the housing 750. Specifically, the control circuit 100 outputs the opening/closing motor control signal OC for causing the opening/closing member 760 to move to the position at which the opening/closing member 760 covers the opening 752. The opening/closing section motor 76 is thereby driven, and the opening/closing member 760 is moved in the X direction upon driving of the opening/closing section motor 76. When the opening/closing member 760 reaches the position at which the opening/closing member 760 covers the opening 752, the control circuit 100 stops the movement of the opening/closing member 760. As a result, the interior space of the housing 750 of the camera unit 70 is closed. That is, in the adjustment mode Mc, the opening/closing member 760 brings the opening 752 into the closed state.

Figure 14:
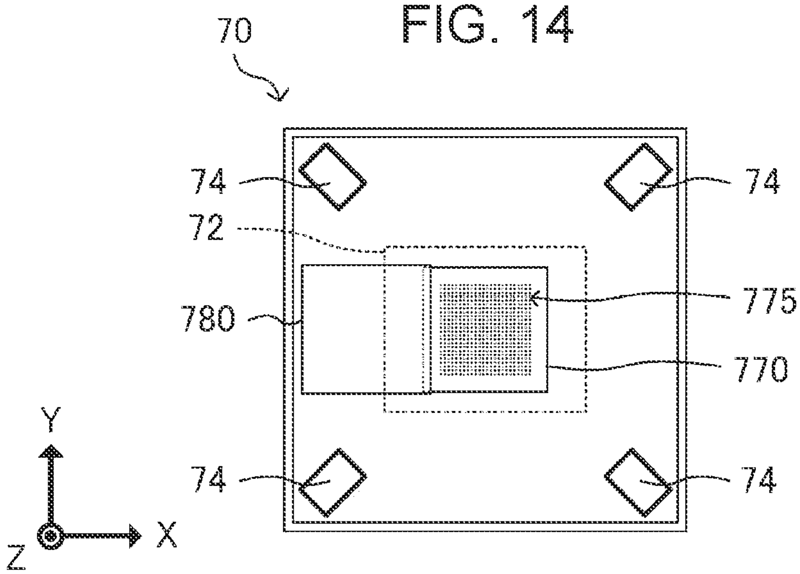
FIG. 14 illustrates the camera unit in the adjustment mode when viewed in the Z direction.

Moreover, as illustrated in FIG. 14, in the adjustment mode Mc, the chart cover 780 is positioned so as not to cover the reference chart 775 provided in the chart plate 770. At this time, the reference chart 775 is positioned within the angle of view Av of the camera 72, and the chart cover 780 is desirably positioned outside the angle of view Av. The camera 72 acquires the reference chart 775 provided in the chart plate 770, and the control circuit 100 performs correction according to the reference chart 775. At this time, in the camera unit 70 of the present embodiment, the possibility of the reference chart 775 being soiled is reduced, thus improving accuracy in calibration of the camera 72. As a result, the possibility of a degradation in quality of image information acquired by the camera 72 is also reduced.

As described above, in the camera unit 70 of the present embodiment, in the print mode Mp, the opening/closing member 760 brings the opening 752 into the closed state, and the chart cover 780 covers the reference chart 775. In the check mode Mt, the opening/closing member 760 brings the opening 752 into the open state, and the chart cover 780 covers the reference chart 775. In the adjustment mode Mc, the opening/closing member 760 brings the opening 752 into the closed state, and the chart cover 780 does not cover the reference chart 775. This reduces the possibility of ink mist entering the housing 750, and even when minute quantities of ink mist enter the housing 750, the possibility of the ink mist attaching to the reference chart 775 is reduced. As a result, the possibility of a degradation in accuracy in calibration of the camera 72 of the camera unit 70 is reduced, and accuracy in acquisition of the pattern image by the camera 72 of the camera unit 70 is improved. Accordingly, accuracy in ejecting liquid by the liquid ejecting apparatus 1 and quality of an image output by the liquid ejecting apparatus 1 are improved.

Here, the print mode Mp is an example of a first mode, the check mode Mt is an example of a second mode, and the adjustment mode Mc is an example of a third mode.

4. Operational Effect

As described above, in the liquid ejecting apparatus 1 of the present embodiment, the camera unit 70 is configured such that, in the print mode Mp, the opening/closing member 760 is controlled to bring the opening 752 into the closed state, and the chart cover 780 is controlled to cover the reference chart 775, in the check mode Mt, the opening/closing member 760 is controlled to bring the opening 752 into the open state, and the chart cover 780 is controlled to cover the reference chart 775, and in the adjustment mode Mc, the opening/closing member 760 is controlled to bring the opening 752 into the closed state, and the chart cover 780 is controlled so as not to cover the reference chart 775. This reduces the possibility of ink mist from the ink ejected from the ejecting head 21 entering the housing 750 of the camera unit 70. Accordingly, accuracy in acquisition of information indicating the state of the ejecting head 21 by the camera unit 70 is improved, thus making it possible to perform appropriate correction for the liquid ejecting apparatus 1. As a result, accuracy in ejecting ink from the liquid ejecting apparatus 1 is improved.

Further, in the liquid ejecting apparatus 1 of the present embodiment, even when ink mist enters the housing 750, the possibility of the ink mist attaching to the reference chart 775 is reduced. This reduces the possibility of a degradation in accuracy in calibration of the camera 72 of the camera unit 70. As a result, accuracy in acquisition of a pattern image by the camera 72 of the camera unit 70 is improved, and accuracy in ejecting liquid by the liquid ejecting apparatus 1 and quality of an image output by the liquid ejecting apparatus 1 are improved.

5. Modified Examples

Although the liquid ejecting apparatus 1 of the present embodiment has been described above assuming that the reference chart 775 for aberration correction is formed in the chart plate 770 of the camera unit 70, the reference chart 775 is not limited thereto and may be a color tone correction chart indicating a reference for a color tone of the ejected ink, such as a white-color-reference plate indicating a reference for a white color.

When the reference chart 775 of the camera unit 70 is a white-color-reference plate, in the check mode Mt, the ejecting head 21 ejects ink onto the medium P to thereby print an image in a predetermined color tone on the medium P, and the camera unit 70 acquires image information of the color tone formed on the medium P. The camera unit 70 generates the image information signal IS including the acquired image information and outputs the image information signal IS to the control circuit 100. The control circuit 100 compares the image information included in the input image information signal IS and information corresponding to the image in the color tone stored in the control circuit 100. In accordance with the result of the comparison, the control circuit 100 determines whether reproducibility of the color tone formed on the medium P and the color of the ink ejected from the ejecting head 21 are appropriate as the ejection state of the ink ejected from the ejecting head 21.

Even in the liquid ejecting apparatus 1 described above, since the opening/closing member 760 controls open/close of the opening 752 of the housing 750, it is possible to reduce the possibility of ink mist entering the housing 750, and since the reference chart 775 is protected by the chart cover 780, the possibility of ink mist attaching to the reference chart 775 is reduced.

Accordingly, accuracy in acquisition of a pattern image by the camera 72 of the camera unit 70 is improved, and an operational effect similar to improvement of accuracy in ejecting liquid in the liquid ejecting apparatus 1 and quality of an image output by the liquid ejecting apparatus 1 is exerted.

Although the liquid ejecting apparatus 1 of the present embodiment has been described above assuming that the camera unit 70 acquires an image formed on the medium P, that is, a predetermined pattern image formed on the medium P, and the control circuit 100 calculates a correction value in accordance with the state of the predetermined pattern image acquired by the camera unit 70, the state of the ejecting head 21, which is acquired by the camera unit 70, is not limited to the predetermined pattern image formed on the medium P. For example, the camera unit 70 may be located, without being mounted on the carriage 20, so as to face the nozzle plate 632 of the ejecting head 21, in which the nozzle 651 is formed, and acquire an image of the nozzle plate 632 in which the nozzle 651 is formed, and the control circuit 100 may determine whether the state of the ejecting head 21 is normal in accordance with the image of the nozzle plate 632, in which the nozzle 651 is formed, acquired by the camera unit 70. Even in such a liquid ejecting apparatus 1, since the opening/closing member 760 controls open/close of the opening 752 of the housing 750, it is possible to reduce the possibility of ink mist entering the housing 750, and since the reference chart 775 is protected by the chart cover 780, the possibility of ink mist attaching to the reference chart 775 is reduced.

Accordingly, accuracy in acquisition of an image of the nozzle plate 632, in which the nozzle 651 is formed, as acquired by the camera 72 of the camera unit 70 is improved, and an operational effect similar to improvement of accuracy in ejecting liquid in the liquid ejecting apparatus 1 and improvement of quality of an image output by the liquid ejecting apparatus 1 is achieved.

The embodiments and the modified examples have been described above, but the disclosure is not limited to the embodiments and can be implemented in various aspects without departing from the gist thereof. For example, the aforementioned embodiments can also be appropriately combined with each other.

The disclosure includes substantially the same configurations (for example, configurations having the same functions, methods, and results, or configurations having the same objects and effects) as the configurations described in the embodiments. Further, the disclosure includes configurations in which non-essential portions of the configuration described in the embodiments are replaced. In addition, the disclosure includes configurations that achieve the same operational effects or configurations that can achieve the same objects as those of the configurations described in the embodiments. Further, the disclosure includes configurations in which a known techniques is added to the configurations described in the embodiments.

The following contents are derived from the aforementioned embodiments.

This liquid ejecting apparatus is a liquid ejecting apparatus that forms an image by ejecting a liquid, and the liquid ejecting apparatus includes: an ejecting head for ejecting the liquid; and a camera unit for acquiring a state of the ejecting head, in which the camera unit includes a camera for imaging an object, a housing in which the camera is housed and which includes an opening on an imaging path that couples the camera and the object, and an opening/closing member configured to open and close the opening, the opening/closing member includes a reference chart serving as a reference for adjustment of the camera and a chart cover, in a first mode, the opening/closing member brings the opening into a closed state, and the chart cover covers the reference chart, in a second mode, the opening/closing member brings the opening into an open state, and the chart cover covers the reference chart, and in a third mode, the opening/closing member brings the opening into the closed state, and the chart cover does not cover the reference chart.

According to the liquid ejecting apparatus, in the first mode, the opening/closing member brings the opening into the closed state, and therefore, even when the ejecting head ejects the liquid in the first mode, the possibility of the liquid entering the housing is reduced, and the chart cover covers the reference chart, and therefore, even when the liquid enters the housing, the possibility of the liquid attaching to the reference chart is reduced. In the second mode, the opening/closing member brings the opening into the open state, and therefore, the camera housed in the housing is able to image an object provided outside the housing, and the chart cover covers the reference chart at this time, and therefore, even when the liquid enters the housing, the possibility of the liquid attaching to the reference chart is reduced. Further, in the third mode, the opening/closing member brings the opening into the closed state, the chart cover does not cover the reference chart, and therefore, adjustment of the camera is able to be performed with the reference chart imaged by the camera in a state in which the possibility of the liquid entering the housing is reduced.

As a result, according to the liquid ejecting apparatus, the possibility of the liquid entering the housing is reduced, and the reference chart serving as a reference for adjustment of the camera is protected by the chart cover, and therefore, even when the liquid enters the housing, the possibility of the liquid attaching to the reference chart is reduced, thereby making it possible to enhance accuracy in adjusting the camera for imaging the object. That is, it is possible to reduce the influence of ink mist floating inside the liquid ejecting apparatus and improve accuracy in acquisition of the state of the ejecting head by the camera unit.

In an aspect of the liquid ejecting apparatus, the ejecting head may eject the liquid to thereby form a pattern image on a medium, and the object may include the pattern image.

According to the liquid ejecting apparatus, even when the camera of the camera unit acquires the pattern image formed on the medium as the object, it is possible to reduce the influence of ink mist floating inside the liquid ejecting apparatus and thus improve accuracy in acquisition of the state of the ejecting head by the camera unit.

In an aspect of the liquid ejecting apparatus, the liquid ejecting apparatus may further include a carriage that moves with the ejecting head mounted thereon, and the camera unit may be mounted on the carriage.

According to the liquid ejecting apparatus, even when the camera unit is mounted on the carriage, it is possible to reduce the influence of ink mist floating inside the liquid ejecting apparatus and thus improve accuracy in acquisition of the state of the ejecting head by the camera unit.

In an aspect of the liquid ejecting apparatus, the ejecting head may include a nozzle for ejecting the liquid, and the object may include the nozzle.

According to the liquid ejecting apparatus, even when the camera of the camera unit acquires a nozzle image as the object, it is possible to reduce the influence of ink mist floating inside the liquid ejecting apparatus and thus improve accuracy in acquisition of the state of the ejecting head by the camera unit.

In an aspect of the liquid ejecting apparatus, the reference chart may be an aberration correction chart.

According to the liquid ejecting apparatus, even when the reference chart is the aberration correction chart, it is possible to reduce the possibility of ink mist floating inside the liquid ejecting apparatus attaching to the reference chart and thus improve accuracy in acquisition of the state of the ejecting head by the camera unit.

In an aspect of the liquid ejecting apparatus, the reference chart may be a color tone correction chart.

According to the liquid ejecting apparatus, even when the reference chart is the color tone correction chart, it is possible to reduce the possibility of ink mist floating inside the liquid ejecting apparatus attaching to the reference chart and thus improve accuracy in acquisition of the state of the ejecting head by the camera unit.

What is claimed is:

1. A liquid ejecting apparatus that forms an image by ejecting a liquid, the liquid ejecting apparatus comprising:
- an ejecting head for ejecting the liquid; and
- a camera unit for acquiring a state of the ejecting head, wherein
- the camera unit includes
  - a camera for imaging an object,
  - a housing in which the camera is housed and which includes an opening on an imaging path that couples the camera and the object, and
  - an opening/closing member configured to open and close the opening,
    - the opening/closing member includes
      - a reference chart serving as a reference for adjustment of the camera and
      - a chart cover,
- in a first mode, the opening/closing member brings the opening into a closed state, and the chart cover covers the reference chart,
- in a second mode, the opening/closing member brings the opening into an open state, and the chart cover covers the reference chart,
- and in a third mode, the opening/closing member brings the opening into the closed state, and the chart cover does not cover the reference chart.

2. The liquid ejecting apparatus according to claim 1, wherein
- the ejecting head ejects the liquid to thereby form a pattern image on a medium, and
- the object includes the pattern image.

3. The liquid ejecting apparatus according to claim 1, further comprising
- a carriage that moves with the ejecting head mounted thereon, wherein
- the camera unit is mounted on the carriage.

4. The liquid ejecting apparatus according to claim 1, wherein
- the ejecting head includes a nozzle for ejecting the liquid, and
- the object includes the nozzle.

5. The liquid ejecting apparatus according to claim 1, wherein
- the reference chart is an aberration correction chart.

6. The liquid ejecting apparatus according to claim 1, wherein
- the reference chart is a color tone correction chart.

* * * * *